(12) United States Patent
Army et al.

(10) Patent No.: US 10,239,625 B2
(45) Date of Patent: Mar. 26, 2019

(54) OZONE CONVERTER WITH ALTITUDE ACTIVATED ACTUATOR

(71) Applicant: HAMILTON SUNDSTRAND CORPORATION, Windsor Locks, CT (US)

(72) Inventors: Donald E. Army, Enfield, CT (US); Christopher McAuliffe, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 218 days.

(21) Appl. No.: 15/205,063

(22) Filed: Jul. 8, 2016

(65) Prior Publication Data

US 2018/0009537 A1   Jan. 11, 2018

(51) Int. Cl.
| | |
|---|---|
| *B01D 47/00* | (2006.01) |
| *B01D 39/00* | (2006.01) |
| *B03C 3/00* | (2006.01) |
| *B64D 13/08* | (2006.01) |
| *B64D 13/02* | (2006.01) |
| *B01D 53/86* | (2006.01) |
| *B64D 13/06* | (2006.01) |

(52) U.S. Cl.
CPC ......... *B64D 13/08* (2013.01); *B01D 53/8675* (2013.01); *B01D 53/8696* (2013.01); *B64D 13/02* (2013.01); *B01D 2255/1023* (2013.01); *B01D 2257/106* (2013.01); *B01D 2258/06* (2013.01); *B01D 2259/4575* (2013.01); *B64D 2013/0685* (2013.01)

(58) Field of Classification Search
CPC ............ B64D 13/06; B64D 2013/0685; C01B 13/0203; B01D 53/8675
USPC ........ 422/4, 119, 120, 900; 96/52, 225, 242, 96/420
See application file for complete search history.

(56) References Cited

U.S. PATENT DOCUMENTS

| | | |
|---|---|---|
| 2,620,719 A | 12/1952 | Price |
| 2,867,989 A | 1/1959 | McGuff |
| (Continued) | | |

FOREIGN PATENT DOCUMENTS

| | | |
|---|---|---|
| EP | 2583743 A1 | 4/2013 |
| GB | 2106635 A | 4/1983 |
| (Continued) | | |

OTHER PUBLICATIONS

European Search Report for Application No. 17179563.6-1754 dated Dec. 5, 2017, 8 pages.

*Primary Examiner* — Monzer R Chorbaji
(74) *Attorney, Agent, or Firm* — Cantor Colburn LLP

(57) ABSTRACT

An ozone converter includes an outer housing having an inlet and an outlet, a first channel disposed between the inlet and the outlet, and a bypass channel disposed between the inlet and the outlet and separated from first channel. The converter also includes a core disposed within the first channel and a bypass control mechanism that includes one more blocking elements that causes inlet air to pass through the first channel or the bypass channel based on an altitude of the ozone converter. The control mechanism includes a piston that moves between at least a first position and a second position and a bellows that controls a flow a pressurized air to the piston.

17 Claims, 4 Drawing Sheets

(56) References Cited

U.S. PATENT DOCUMENTS

| | | | |
|---|---|---|---|
| 3,035,408 A * | 5/1962 | Silver | F02B 37/186 |
| | | | 137/489 |
| 4,391,290 A | 7/1983 | Williams | |
| 5,429,663 A | 7/1995 | Cassidy et al. | |
| 9,056,276 B2 | 6/2015 | Army et al. | |
| 9,133,028 B2 | 9/2015 | Army et al. | |
| 2015/0375848 A1 | 12/2015 | Lucas et al. | |

FOREIGN PATENT DOCUMENTS

| | | |
|---|---|---|
| JP | H0999047 A | 4/1997 |
| WO | 2015055672 A1 | 4/2015 |

\* cited by examiner

US 10,239,625 B2

OZONE CONVERTER WITH ALTITUDE ACTIVATED ACTUATOR

BACKGROUND OF THE INVENTION

The subject matter disclosed herein relates to an ozone converter and in particular to an ozone converter for use with an aircraft environmental control system.

Aircraft have power systems that are comprised of several components, such as an engine, an environmental control system and a thermal management system. These systems are designed relatively independently from each other with power being transferred from one system to another.

The environmental control system supplies pressurized air to the cabin and flight deck of an aircraft. The ambient air is drawn either from the compressor stage of an engine (a bleed air system) or a dedicated compressor. At high altitude (e.g., greater than 20,000 ft (6096 m)), the ambient air contains unacceptable levels of ozone ($O_3$). Passenger comfort and/or compliance with regulations or agreements can limit the amount of ozone provided to the cabin and flight deck. As such, commercial aircraft generally include an ozone converter that converts ozone to oxygen ($O_2$).

Ozone converters typically include an ozone-converting core (core) that includes a catalyst which causes the ozone to decompose to oxygen. To minimize the core's exposure to contamination and extend the life of the converter, one approach is to externally bypass air around the converter when the aircraft is at low altitude.

BRIEF DESCRIPTION OF THE INVENTION

According to one embodiment, an ozone converter is disclosed. The converter includes an outer housing having an inlet and an outlet, a first channel disposed between the inlet and the outlet, and a bypass channel disposed between the inlet and the outlet and separated from first channel. The converter also includes a core disposed within the first channel and a bypass control mechanism that includes one more blocking elements that causes inlet air to pass through the first channel or the bypass channel based on an altitude of the ozone converter. The control mechanism includes a piston that moves between at least a first position and a second position and a bellows that controls a flow a pressurized air to the piston.

According to another embodiment, a system that includes one or more air parameter adjusting devices that change one or both of the temperature and pressure of the input air to produce conditioned air and an ozone converter in fluid communication with the one or more air parameter adjusting devices is disclosed. The converter includes an outer housing having an inlet and an outlet, a first channel disposed between the inlet and the outlet, and a bypass channel disposed between the inlet and the outlet and separated from first channel. The converter also includes a core disposed within the first channel and a bypass control mechanism that includes one more blocking elements that causes inlet air to pass through the first channel or the bypass channel based on an altitude of the ozone converter. The control mechanism includes a piston that moves between at least a first position and a second position and a bellows that controls a flow a pressurized air to the piston.

BRIEF DESCRIPTION OF THE DRAWINGS

The subject matter which is regarded as the invention is particularly pointed out and distinctly claimed in the claims included at the conclusion of the specification. The foregoing and other features, and advantages of the invention are apparent from the following detailed description taken in conjunction with the accompanying drawings in which:

DETAILED DESCRIPTION OF THE INVENTION

Figure 1:
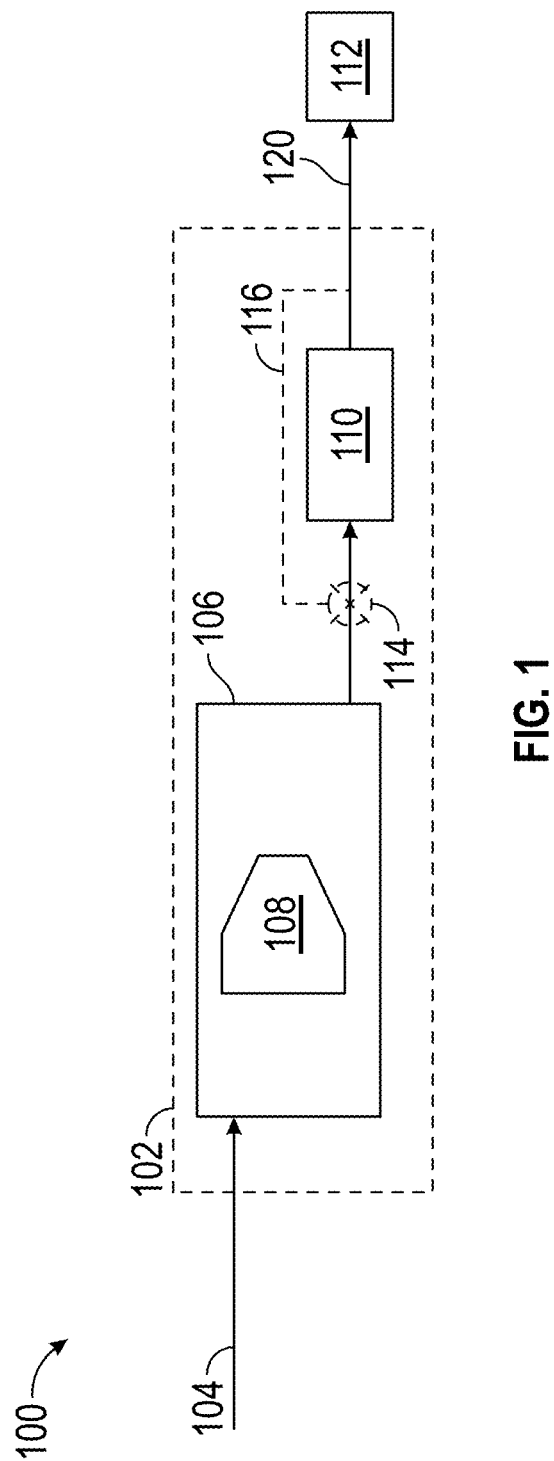
FIG. 1 is a block diagram illustrating a system in which embodiments of the present invention can be implemented.

FIG. 1 illustrates a system 100 in which embodiments of the present invention may be implemented. The system 100 can be part of an aircraft or any other type of apparatus that can cause the system 100 to be moved in a forward direction. For clarity, the following description will assume that the system 100 is part of an aircraft but it is not so limited.

The system 100 illustrated in FIG. 1 includes an environmental control system (ECS) 102. The ECS 102 receives input air 104 and provides output air 120 to a location 112 within an apparatus. For example, the location 112 could be the flight deck or passenger compartment of an aircraft. It shall be understood that the ECS 102 shown in FIG. 1 is extremely simplified and could include many other or different elements.

As illustrated, the ECS 102 includes an air parameter adjusting unit 106. The air parameter adjusting unit 106, generally, converts the pressure and/or temperature of the input air 104 to a desired level. In one embodiment, the input air 104 is bleed air from a compressor section of an engine. In another embodiment, the input air 104 is ram air received directly from the atmosphere. Regardless of the source of the input air 104, the air parameter adjusting unit 106 may include a parameter adjustment device 108 that can be operated to adjust the temperature/pressure of the input air 104. The parameter adjustment device 108 includes a turbine and/or a compressor. In one embodiment, the parameter adjustment device 108 is an electric compressor that compresses ram air.

If the input air 104 is received while the aircraft is at high altitude, there may a requirement (e.g., contractual or regulatory) that ozone be removed from the input air 104 before being provided to location 112 as output air 120. To that end, the ECS 102 also includes an ozone converter 110 coupled between the air parameter adjusting unit 106 and the location 112. The exact location of the ozone converter 110 can be varied from that shown in FIG. 1 in different embodiments of the present invention.

As discussed above, in some cases it may be desirable to bypass the ozone converter 110 when the ECS 102 receives input air 104 from a low altitude source. To accomplish this, one prior art approach was to include bypass line 116 and diverter 114 that caused the input air 104 to be bypassed around the ozone converter 110. In FIG. 1, bypass line 116 and diverter 114 are shown in dashed line to indicate that they are not required (or even desired) components of the ECS 102 according to one embodiment.

Embodiments of the present invention are directed to an ozone converter 110 that can be used in the system 100. According to one embodiment, the ozone converter 110 includes an internal bypass that allows air to bypass the ozone converter's core without requiring a separate external bypass (e.g., without requiring either diverter 114 or bypass line 116). Embodiments herein include an altitude controlled bypass system that allows the core to be bypassed at low altitude while causing air to pass through the core when the aircraft is at high altitude. That is, at high altitude, the core is not bypassed. Herein, the pressure of the air output by the parameter adjustment device 108 is above a threshold altitude that causes the bypass system to force air through the core when the aircraft is at or above 10,000 feet. This may occur when the output pressure of the parameter adjustment device 108 is above 10 psig.

In one embodiment, an evacuated bellows is used to sense altitude. Expansion and contraction of the bellows will position a variable orifice which is used to modulate the servo pressure to for bypass device's pneumatic piston. The source for servo pressure is either the ozone converter inlet or outlet in one embodiment. At low altitudes, the bellows with variable orifice controls servo pressure to ambient and the delta pressure across the piston is zero. The piston spring drives the piston to open the bypass and close the ozone converter flow path. From time to time herein, the ozone converter path may be referred to as the first or other path.

At high altitudes, the bellows with variable orifice controls servo pressure to greater than ambient (>10 psig) and the delta pressure across the piston is sufficient to fully compress the piston spring and drive the piston to close the bypass and open the ozone converter flow path. In one embodiment, a manual wrenching feature and a lock pin are provided that can be used to lock the bypass open or closed. In the below description, the bellows driven control orifice is shown as a poppet configuration. The orifice can also be a shear configuration (i.e. fork and post). Among possible advantages, the ozone converter and bypass is completely self-contained with no external connections or control and/ or no change to a main control unit (mechanical or software) is needed.

Figure 2:
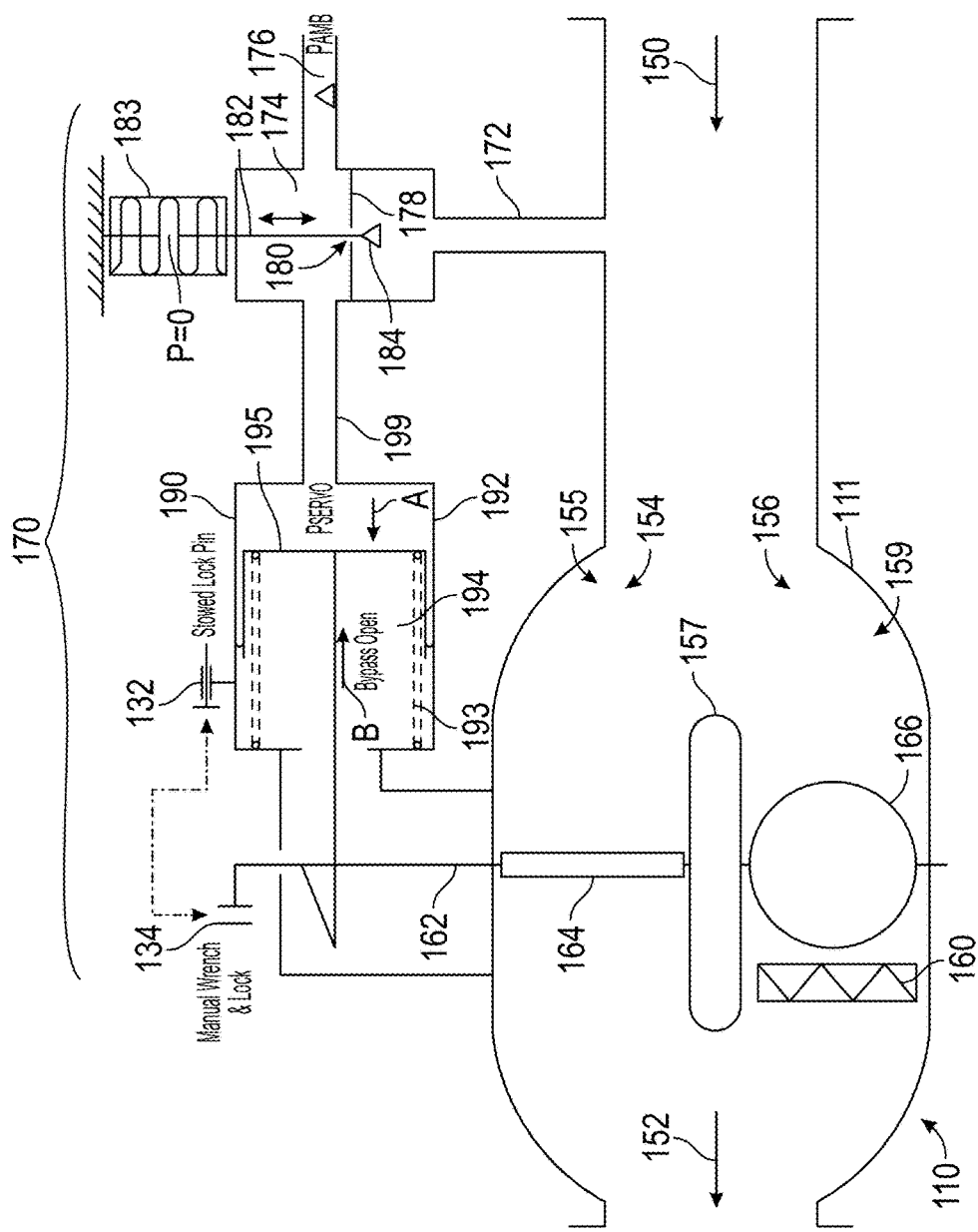
FIG. 2 shows a block diagram of one example of an altitude controlled bypass system.

FIG. 2 shows an example of ozone converter 110 that includes an internal bypass system. The ozone converter 110 includes an outer housing 111 that defines at least two different flow paths 154, 156 separated by separator 157. Flow path 154 passes through a bypass channel 155 and flow path 156 passes through a first or other channel 159. Inlet flow 150 is received from an external source and is provided into the ozone converter 110. The inlet flow 150 may be air received from a portion of an ECS such as a cabin air compressor (CAC). The input air may be at a pressure of anywhere from 2.5 psig at ground and about 10 psig when at or above 20,000 feet. As illustrated, ozone converter 110 includes a bypass control system that includes two flow blocking elements 164, 166 connected to a control shaft 162. Rotation of the shaft 162 will cause the relative positions of the blocking elements 164, 166 to either completely or partially block the flow paths 154, 156 causing air to pass through, as desired, either the bypass 155 or other channel 159. The exact formation of the separator 157 that separates the by bypass channel 155 from the first or other channel 159 may be varied from that shown and may actually surround one of the channels (e.g, FIG. 3).

As illustrated, the flow path 156 is open and path 154 is closed. In this configuration, input flow 150 is directed through path 156 where it is forced to pass through ozone converting core 160 disposed in the first channel 159. The core 160 (or any other core described herein) can be formed of any type of material that causes or otherwise aids in the conversion of ozone into oxygen. For instance, in one embodiment, the core 160 is formed at least partially of palladium. The air in flow path 156 then leaves the converter as outlet flow 152 with a lower ozone content that it entered (e.g., lower than contained in flow 150).

As discussed above, in some cases, it may be desirable (e.g., when on the ground) to have the air bypass the core 160. To that end, an altitude activated controller 170 includes a piston housing 192 and a piston input system 174. The piston input system 174 controls the pressure of the air provided to the piston housing 192. When that air exceeds a certain value, the piston 195 moves to an open position within the housing 192. The "pressure" that is provided to the piston housing is provided to the input side 192 of the piston. The other side of the piston 195 may be referred as a compression side and be denoted by reference numeral 194. Biasing mechanisms 193 are provided that can be compressed when the pressure in the input side 192 exceeds the force provided by the biasing mechanisms. An example of biasing mechanism 192 is a spring but any mechanism may be employed.

As illustrated in FIG. 2, the piston 195 has been shifted away from the outer housing 192 in the direction generally shown by arrow A. As discussed above, this occurs when the pressure in the input side 192 exceeds the force exerted in direction B by biasing mechanism 193. The piston 195 is physically connected either directly or through a linkage to the shaft 162. When the piston 195 moves in direction A, the shaft 162 is rotated or otherwise altered such that blocking element 164 closes off path 154 and blocking element 166 is arranged such that input flow 150 is allowed to pass through flow path 156 and, consequently, through core 160. Such a case may occur, for example, when the pressure of the input flow is at or above about 10 psig. In contrast, when the pressure on the input side 192 is less than the force provided in direction B by the biasing mechanism 193, the piston will move in direction B. When the piston 195 moves in direction B, the shaft 162 is rotated or otherwise altered such that blocking element 166 closes off path 156 and blocking element 166 is arranged such that input flow 150 is allowed to pass through flow path 154 and, consequently, through bypassing core 160. Such may occur when the aircraft is on the ground our below a certain altitude such as 10,000 or 15,000 feet.

It shall be understood that the pressure on the input side is received from the input flow 150. As illustrated, this can be achieved by providing a path through an inlet flow diverter passage 172. The diverter passage 172 provides a portion of the input flow 150 to a variable orifice flow control element shown as element 174. The flow control element 174 includes a divider 178 that includes an orifice 180 or hole formed therein. The portion of the orifice through which air may pass is controlled by the position of a stopper element 184. The combination of the stopper element 184 and the orifice 180 may form a so-called "poppet valve." As stopper element 184 is moved to increase the portion of the orifice 180 through which air may pass, the pressure on the input side 192 will approximate the pressure of flow 150. The pressure of flow 150 may be controlled by the air parameter adjusting unit 106 (FIG. 1) that may be a part of the ECS such as a CAC. As illustrated, the air provided to the input side is received from the input flow. In another embodiment, the air could be received from the output flow 152. In such a case, the location where the inlet flow diverter passage 172 is connected can be moved such that it receives the output flow.

The flow control element 174 includes a piston connection 199 that fluidly connects it to input side 192. The flow control element 174 may also include an ambient outlet 176 configured to allow air to vent to ambient via ambient outlet 176. The sizing of the ambient outlet 176 can be such that most of the air pressure is directed towards the input side 192 when the aircraft is over a certain height and the pressure of the input air 150 is greater than the ambient air pressure. In one embodiment, after the aircraft lands or falls below a certain altitude, and the poppet valve (e.g., the stopper element and orifice 180 combination) has closed, the pressure in the input side 192 is allowed to vent through outlet 176 to ambient overtime. As this happens, the biasing mechanism 193 will return to a "base" position by moving in direction B and causing the bypass path (path 154) to be opened in the manner as described above.

As described above, the location of piston 195 controls whether the input flow 150 that is not passing into diverter passage 172 passes through path 154 or path 156. Further, as described above, the location of the piston is determined by whether or not the poppet valve is open. The poppet valve is open when stopper 184 is in an extended position and is closed when it is in the retracted position. The location of the stopper 184 is determined by the state of a bellows 183. The bellows 183 is connected is connected to and controls the positon of a control rod 182 or other connector fixed to the stopper. The bellows 183 expands when ambient air pressure reduces. Such expansion will cause the stopper 184 (via rod 182) to open the orifice 180 and cause the piston 195 to move in direction A. As described above, this will cause the flow 150 to follow path 156 and pass through core 160 to remove ozone from it. In one embodiment, the bellows 183 may be sized or otherwise configured such that it causes the orifice 180 to open at or above 10,000 feet.

An optional manual locking element comprised of a pin 132 and a lock 134 may also be provide to lock the converter 110 into a bypass mode in the event that the core is fouled. It shall be understood that the above elements could lock the converter into another mode as well and other combinations of elements may be utilized to provide a locking element to lock the converter into a particular mode.

Figure 3:
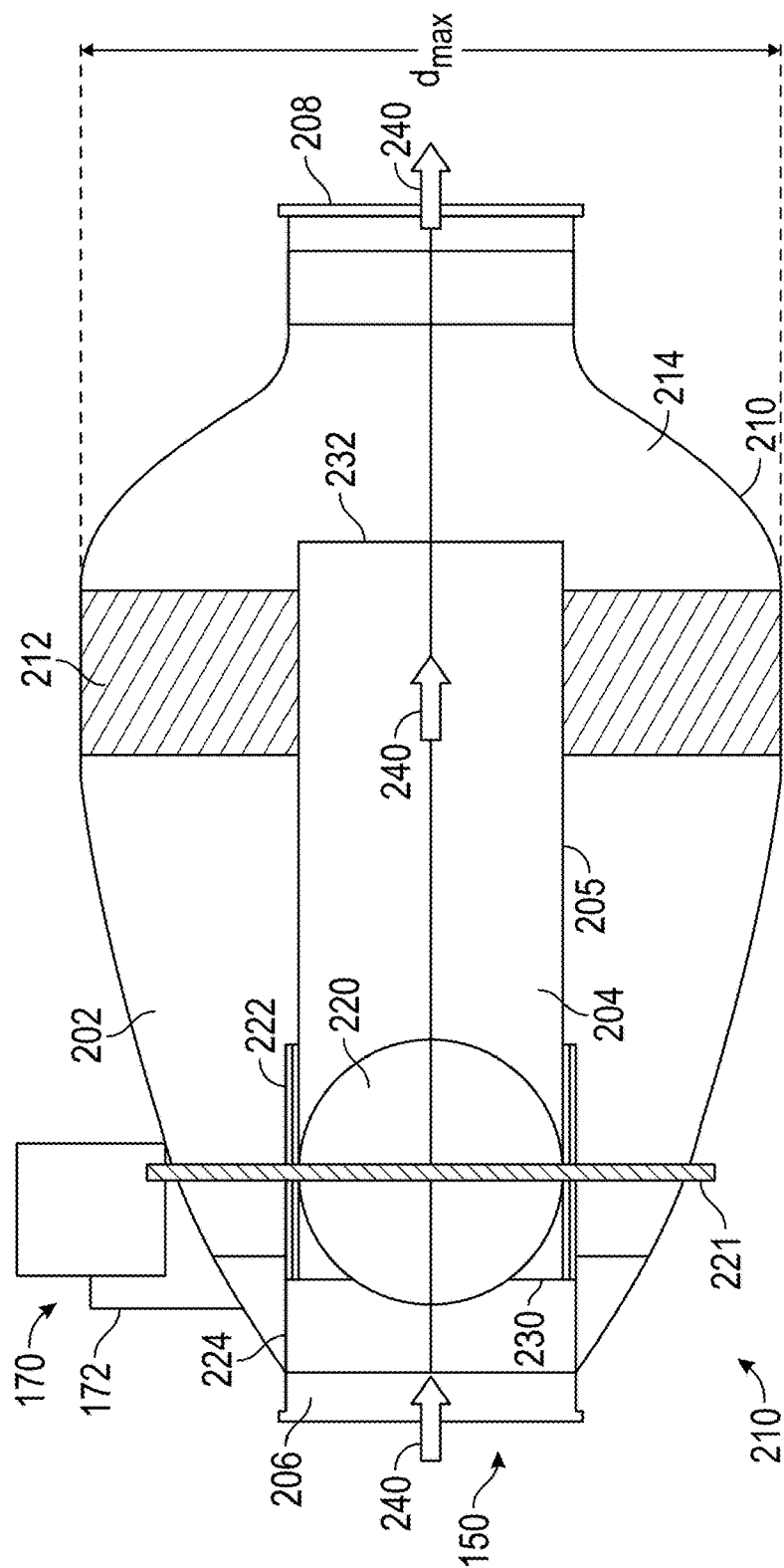
FIG. 3 shows a block diagram of another example of an altitude controlled bypass system.

FIG. 3 illustrates an embodiment of another type of internal bypass ozone converter 210 in the "open" or "bypass" state. The ozone converter 210 includes two separate air passages though which air can pass through it. In particular, the ozone converter 210 includes an outer passage 202 and an internal bypass 204. In this embodiment, the outer passage 202 surrounds at least a portion of the internal bypass 204. The ozone converter 210 includes an altitude activated controller 170 connected thereto. The altitude activated controller 170 may work in the same manner as described above. While connection 172 is shown as being connected outer passage 202 it shall be understood that it can located at any location where it receives an inlet flow such as flow 150.

The ozone converter 210 includes an inlet 206 and an outlet 208. Regardless of the state of the ozone converter 210, air enters at inlet 206 and exits at outlet 208. In the illustrated embodiment, the inlet 206 and outlet 208 are connected to one another by an exterior shell 210, which is also referred to as outer shell or outer housing 210. The term "downstream" as used herein related to components or locations shall refer to the order in which a substance (e.g. air) traverses the components. In particular, a component or location is downstream of another if air passes through the component or location after passing through the other component or location. For example, assuming air is flowing from left to right in FIG. 3, outlet 208 is downstream of inlet 206. Conversely, and in the same vein, inlet 206 is upstream of outlet 208.

Enclosed within the outer shell is a core 212. The core 212 can be formed of any type of material that causes or otherwise aids in the conversion of ozone into oxygen. For instance, in one embodiment, the core 212 is formed at least partially of palladium. In one embodiment, the internal bypass 204 passes through the core 212. That is, air that enters the internal bypass 204 can traverse from the inlet 206 to the outlet 208 without contacting the core 212. In one embodiment, the internal bypass 204 is arranged along a central axis 214 of the ozone converter 210 and has a generally cylindrical shape. A bypass cylinder 205 defines the internal bypass 204 in one embodiment.

The bypass cylinder 205 includes a blocking element 220 disposed therein. In one embodiment, the blocking element 220 is circular disc. The blocking element 220 can be translated from an open position where air can travel through the internal bypass 204 to a closed position where it blocks air from passing through internal bypass 204. As such, the blocking element 220 has area that is the same or nearly the same as an area of an inner diameter of the bypass cylinder 205 so that it can effectively block air from traveling through the bypass cylinder 205 when the ozone converter 210 is in the bypass state. In one embodiment, the translation from the open to closed position (and vice-versa) can be effected by rotation of a rod 221 to which the blocking element 220 is coupled. In combination, the rod 221 and the blocking element 220 form a butterfly valve. As illustrated, the rod 221 passes through the walls of the bypasses cylinder 205 at two locations. The altitude activated controller 170 controls the positioning of the rod 221 and, thus, controls, whether the converter 210 is in the open or closed position.

In the illustrated embodiment, air is prevented from entering the outer passage 202 by a blocking sleeve 222 that surrounds a portion of the bypass cylinder 205 proximal the inlet 206. The blocking sleeve 222 is arranged such that when the blocking element 220 is in the open position (e.g., the ozone converter 210 is in the bypass state), the blocking sleeve 222 blocks air from entering an outer passage opening 224 that exists between the inlet 206 and an end 230 of the bypass cylinder 205. As generally described above, in one embodiment, the other end 232 of the bypass cylinder 205 extends to a location downstream of the core 212. It shall be understood, however, that the blocking sleeve 222 could be disposed within the bypass cylinder 205 in one embodiment. In FIG. 3, the path of flow 150 through the ozone converter 210 is shown by arrows 240.

Figure 4:
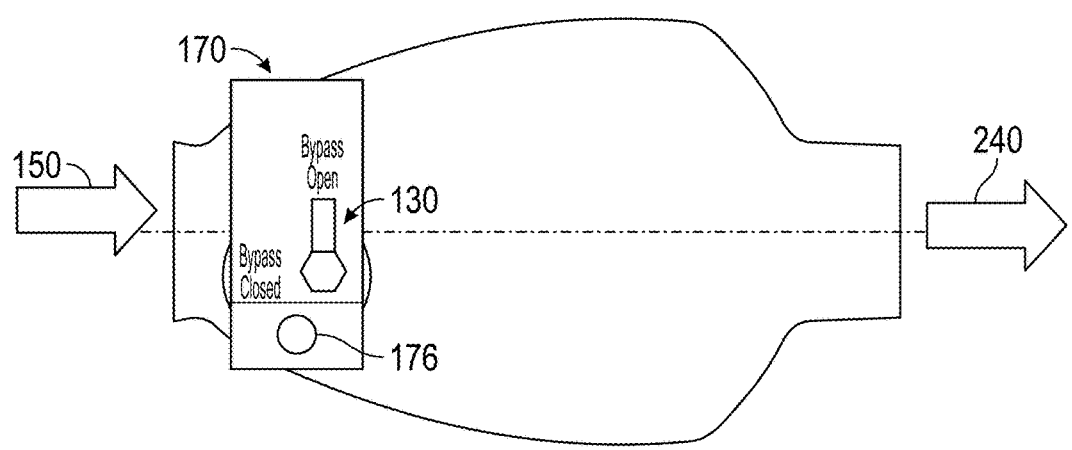
FIG. 4 shows a perspective view of the system of FIG. 3.

FIG. 4 shows top view of the converter 210 shown in FIG. 3. The altitude activated controller 170 includes a locking mechanism 130 that can include portions such as elements 132 and 134 (FIG. 2) described above. Also illustrated is the ambient outlet 176.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An ozone converter comprising:
    an outer housing having an inlet and an outlet;
    a first channel disposed between the inlet and the outlet;
    a bypass channel disposed between the inlet and the outlet and separated from first channel;
    a core disposed within the first channel that converts ozone into oxygen as air passes through it; and
    a bypass control mechanism that includes one more blocking elements that causes inlet air to pass through the first channel or the bypass channel based on an altitude of the ozone converter, the control mechanism including:
        a piston that moves between at least a first position and a second position; and
        a bellows that controls a flow a pressurized air to the piston.

2. The ozone converter of claim 1, wherein when the bellows is in a compressed state, the pressurized air is blocked from contacting the piston.

3. The ozone converter of claim 1, wherein the bellows is connected to and controls the operation of a poppet valve that blocks the pressurized air from reaching the piston when the ozone converter is below a threshold altitude.

4. The ozone converter of claim 1, wherein the bypass control mechanism further includes a flow control element including:
    an inlet;
    a piston connection;
    an ambient outlet; and
    a separator wall disposed between the inlet and one or both of the piston connection and the ambient outlet;
    wherein the bellows is connected to a blocking element that is arranged to control a flow of air received at the inlet through the orifice based on movement of the bellows.

5. The ozone converter of claim 4, wherein the piston is contained in a piston housing and separates the housing into an input side and a compression side, and
    wherein, the piston connection fluidly connects the flow control element to the input side.

6. The ozone converter of claim 5, wherein the piston is connected to a biasing mechanism that urges the piston to compress the inlet side.

7. The ozone converter of claim 6, further comprising:
    a blocking sleeve that surrounds a portion of the bypass channel and that is moveable from a first position to a second position, wherein in the first position air that enters in the inlet is directed by the blocking sleeve into the bypass channel and in the second position air that enters the inlet is allowed to enter the first channel;
    wherein the first channel surrounds the bypass channel.

8. The ozone converter of claim 6, wherein the piston is connected to a rod that, when moved, causes the one or more blocking elements to move.

9. A system comprising:
    one or more air parameter adjusting devices that change one or both of the temperature and pressure of the input air to produce conditioned air; and
    an ozone converter in fluid communication with the one or more air parameter adjusting devices, the converter including:
        an outer housing having an inlet and an outlet;
        a first channel disposed between the inlet and the outlet;
        a bypass channel disposed between the inlet and the outlet and separated from first channel;
        a core disposed within the first channel that converts ozone into oxygen as air passes through it; and
        a bypass control mechanism that includes one more blocking elements that causes inlet air to pass through the first channel or the bypass channel based on an altitude of the ozone converter, the control mechanism including:
            a piston that moves between at least a first position and a second position; and
            a bellows that controls a flow a pressurized air to the piston.

10. The system of claim 9, wherein the pressurized air is received from the one or more air parameter adjusting devices.

11. The system of claim 9, wherein when the bellows is in a compressed state, the pressurized air is blocked from contacting the piston.

12. The system of claim 9, wherein the bellows is connected to and controls the operation of a poppet valve that blocks the pressurized air from reaching the piston when the ozone converter is below a threshold altitude.

13. The system of claim 9, wherein the bypass control mechanism further includes a flow control element including:
    an inlet fluidly connected to the inlet;
    a piston connection;
    an ambient outlet; and
    a separator wall disposed between the inlet and one or both of the piston connection and the ambient outlet;
    wherein the bellows is connected to a blocking element that is arranged to control a flow of air received at the inlet through the orifice based on movement of the bellows.

14. The system of claim 13, wherein the piston is contained in a piston housing and separates the housing into an input side and a compression side, and
    wherein, the piston connection fluidly connects the flow control element to the input side.

15. The system of claim 14, wherein the piston is connected to a biasing mechanism that urges the piston to compress the inlet side.

16. The system of claim 15, further comprising:
    a blocking sleeve that surrounds a portion of the bypass channel and that is moveable from a first position to a second position, wherein in the first position air that enters in the inlet is directed by the blocking sleeve into the bypass channel and in the second position air that enters the inlet is allowed to enter the first channel;
    wherein the first channel surrounds the bypass channel.

17. The system of claim 15, wherein the piston is connected to a rod that, when moved, causes the one or more blocking elements to move.

* * * * *